April 30, 1935.  B. SASSEN  1,999,787

DUAL PATTERN CONTROLLED MACHINE TOOL

Filed Sept. 28, 1932    2 Sheets-Sheet 1

Inventor
BERNARD SASSEN
By AHK Parsons
Attorney

Patented Apr. 30, 1935

1,999,787

UNITED STATES PATENT OFFICE

1,999,787
DUAL PATTERN CONTROLLED MACHINE TOOL

Bernard Sassen, Cincinnati, Ohio, assignor to The Cincinnati Milling Machine Company, Cincinnati, Ohio, a corporation of Ohio Application September 28, 1932, Serial No. 635,982

27 Claims. (Cl. 90—13.5)

This invention relates to machine tools and more particularly to improvements in pattern controlled milling machines.

In the manufacture of products having a wide demand and therefore requiring high production methods of manufacture, the shapes of some component parts are not always such that they lend themselves to finishing operations performable in one set-up of the part. This is especially true of unsymmetrical parts, that is, pieces in which one-half is not an opposite-handed replica of the other half, so that the same operation cannot be performed on both halves simultaneously. For instance, if both halves of a work piece have irregular surfaces thereon which must be finished by pattern controlled methods and the pattern or profile of one-half is not an opposite-handed replica of the pattern or profile of the other half the work cannot be finished in one set-up in available pattern controlled machines. It should thus be obvious that such work must be set up and pass through a second machine after the profile on the first half has been finished.

One of the objects of this invention therefore is to provide an improved profiling machine for finishing such unsymmetrical work pieces in a single set up, thereby saving time in manufacture which will reduce the cost thereof and also increase the accuracy of the product.

Another object of this invention is to provide improved control mechanism for regulating the rate of table feed in a pattern controlled machine tool having dual tracer controlled mechanisms whereby the rate of table feed will automatically be the lower of the two rates determined by said mechanisms.

Another object of this invention is to provide a pattern controlled milling machine which is capable of reproducing two different patterns from two different profiles on a part or parts carried by the same table.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Briefly, this invention contemplates the use of a plurality of tracer controlled mechanisms, any one of which if taken separately would so control a pair of slides movable transversely of one another that one slide would be moved at a maximum rate when the second slide is stationary, and which will reduce this maximum rate even to zero upon initiation of movement and acceleration of the other slide. In other words, as the velocity of the one slide is increased, the velocity of the second slide is decreased so that the movement of the one is complementary to the movement of the other.

It will now be obvious that if two such tracer controlled mechanisms are associated with a common work slide that a conflict would exist as to the rate of table movement because it is obvious that one tracer mechanism may determine a fast rate for table movement and the other tracer mechanism may determine a slow rate for table movement. Two such tracer mechanisms have, however, been combined in the present machine with a common work slide in such a manner that the slower of the two rates as determined by the different tracer mechanisms will automatically prevail upon the work slide.

Figure 1:
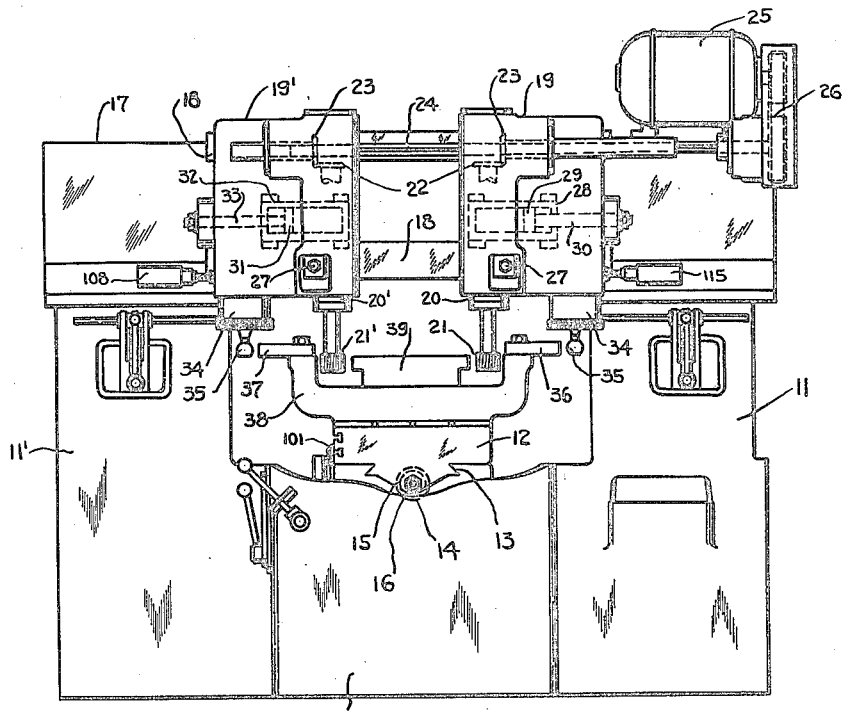
Figure 1 is an elevation of a machine embodying the principles of this invention.

One embodiment of this invention is illustrated in Figure 1 in which the reference numeral 10 indicates the base of the machine having columns 11 and 11' upstanding upon opposite sides thereof. A common work table 12 is reciprocably mounted on guideways 13 carried by the bed and reciprocation thereof is effected by means of a cylinder 14 having a contained piston 15 which is operatively connected to the table by a piston rod 16.

A horizontal rail 17 is supported by the column members 11 and 11' on which is provided guideways 18 for supporting a pair of cutter spindle carriers 19 and 19' above and in operative relation to the work table. The carriers have cutter spindles 20 and 20' respectively journaled therein for rotating profiling cutters 21 and 21'. Each spindle has a bevel gear 22 operatively connected thereto, these gears meshing with similar gears 23 splined on a common driving shaft 24 which is rotated by a prime mover 25 carried by the rail through reduction gearing indicated generally by the reference numeral 26. To facilitate set up and adjustment, each spindle may be provided with a quill adjustment of a well-known type terminating in adjusting members 27.

The carrier 19 is reciprocated on the rail by means of an hydraulic motor comprising a cylinder 28 having a contained piston 29, the piston being operatively connected to the slide through a piston rod 30. Similarly, the slide 19' is moved by a piston 31 reciprocably mounted in a cylinder 32, the piston being operatively connected to the slide through piston rod 33. Each carrier also has mounted thereon a tracer head 34 of known construction which may be the same as that shown in co-pending application of Sassen and Ernst, Serial Number 634,013 filed September 20, 1932.

Figure 2:
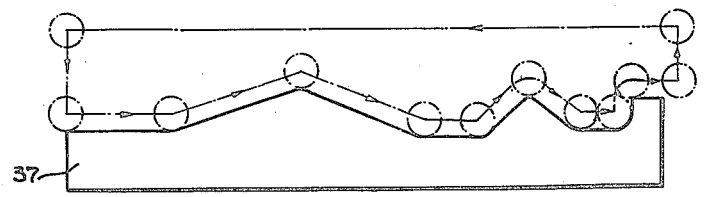
Figure 2 is a diagram illustrating unsymmetrical paths of different cutters during a single traverse of a work piece relative to the cutters.
Figure 2:
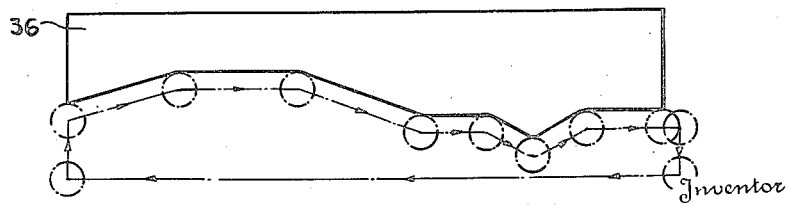

Each tracer head has a tracer button 35, the tracer button of the carrier 19 cooperating with the pattern 36 and the tracer button of the carrier 19' cooperating with the pattern 37. These patterns may be of the plate cam type and supported by separate brackets or by a common bracket, such as 38, which in turn is secured to the work table 12 for movement relative to the tracer buttons. These patterns may be of different shapes and for the sake of illustration the outline of two such patterns has been illustrated in Figure 2. The work 39 is mounted on the table between the patterns and cutters in the relation shown so that the opposite sides of the work may be finished to two different profiles simultaneously during a single pass of the work past the cutters. This arrangement makes it possible to finish unsymmetrical work pieces to different profiles on their opposite sides in a single set-up. It will be apparent, however, that the work may comprise two separate pieces rather than a single piece, if so desired.

Figure 3:
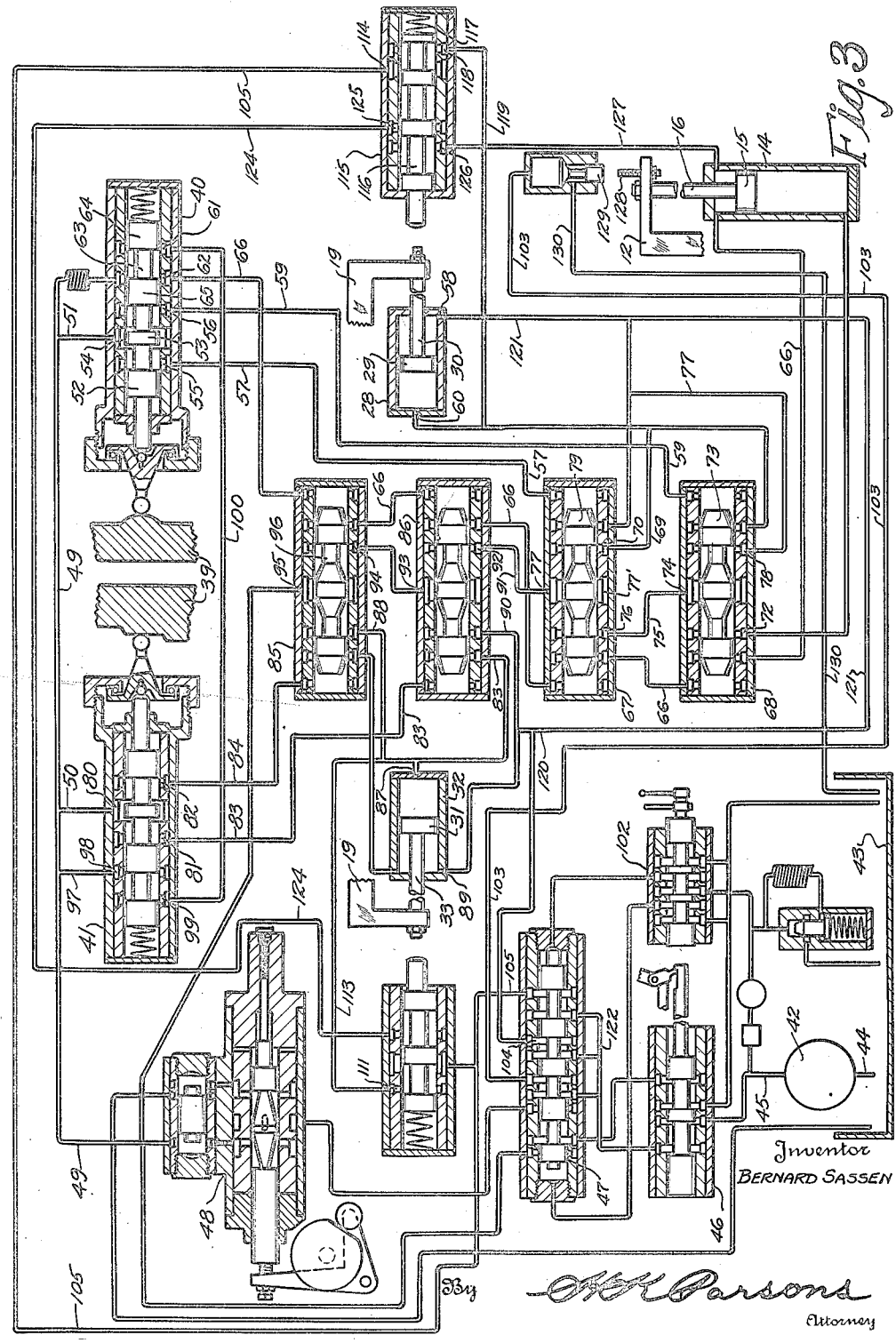
Figure 3 is a diagram of the hydraulic control circuit.

Each tracer is operatively connected to a tracer control valve which valve is of similar construction to that shown in the co-pending application supra, and connected thereto by the same mechanism. These valves are diagrammatically illustrated in Figure 3, the valve associated with the carrier 19 being designated generally by the reference numeral 40 and the one controlling the movement of slide 19 being indicated by the reference numeral 41. If flexible connections are used, the valves may be mounted directly on the slides in which case the tracers would be directly connected to the valve as shown in Figure 3, but the operation of the valve is the same in every instance. Fluid pressure is supplied to these valves from a constant displacement pump 42 which withdraws fluid from a reservoir 43 through channel 44 and discharges the same into channel 45. The channel 45 may be connected to a stop valve 46, a cycle control valve 47 and a rate control valve 48 in the order recited and in a similar manner to that shown in previously mentioned co-pending application. In any event the final supply line 49 extending to the flow dividing valves will be supplied with fluid, the volume of which may be varied to vary the rate of operation of the machine.

The two flow dividing or tracer controlled valves 40 and 41 are connected in parallel by branch lines 50 and 51 to the main supply line 49. The flow dividing valve 40 has a reciprocable plunger 52 on which is formed a spool 53 of sufficient width to close almost the port 54 to which the incoming line 51 is connected. Additional ports 55 and 56 are formed in the valve housing and adapted to be alternately connected to pressure line 51 upon movement of spool 53 from the neutral or normal position shown by the tracer mechanism. The port 55 is connected by channel 57 to the port 58 in one end of cylinder 28 whereby admission of pressure thereto will cause the cutter slide 19 to move in, or in other words toward the work. Similarly, port 56 is connected by channel 59 to port 60 in the opposite end of cylinder 28 whereby admission of pressure thereto will cause out movement of the cutter slide. From this it will be seen that when the tracer is in what may be termed a neutral position, that no fluid will flow in channels 57 or 59 and the cutter slide 19 will remain stationary in whatever position it may happen to be and that upon deflection of the tracer from this neutral position the spool 53 will be moved to connect fluid to one or the other of these lines to effect movement of the slide, and this movement will continue so long as the tracer remains deflected from its neutral position.

It will be understood that the tracer is given a predetermined amount of deflection when brought into engagement with the pattern which amount is sufficient to move the tracer controlled valve to its neutral position. This is necessary in order that the tracer may have positive and negative deflection and thus be able to respond to cavities as well as eminences on the pattern.

The valve 40 is also provided with an additional port 61 which is adapted to be connected with port 62 by the cannelure 63 formed in the valve plunger. Spools 64 and 65 are formed on opposite sides of this cannelure and in such relation that when the valve is in a neutral position each spool closes its respective port half way, so that movement in either direction will cause a further restriction of one or the other of the ports. The port 62 is connected by channel 66 to the table cylinder to cause relative feed movement of the work with respect to the cutter and it will be seen that when the valve is in a neutral position that the full flow of the pump is delivered to the table cylinder to effect a maximum feed rate and that upon deflection of the tracer in either direction that the feed rate will be reduced because part of the fluid is diverted to the cutter slide cylinder to effect either in or out adjustment thereof.

From the foregoing it will be seen that the table feed channel 66 may be simultaneously coupled with channel 57 to pressure constituting one pair, or it may be simultaneously coupled to pressure at the same time as channel 59 constituting a second pair. From this it will be seen that the valve 40 serves to proportionately divide the incoming flow between different pairs of channels and in different volumetric proportions and since the work resistances encountered by the different volumetric flows may be unequal and of different unit pressures, it is necessary to provide means for maintaining these volumetric proportions irrespective of variations in work resistances.

To this end a balancing valve 67 is provided between the table feed line 66 and channel 57 of the cutter slide to maintain the volumetric flows thereto when these two lines are simultaneously coupled with pressure; and a second balancing valve 68 is inserted between the table feed line 66 and the outfeed line 59 of the cutter slide cylinder to maintain the proportionate flow therebetween when simultaneously coupled to pressure. These valves may be made to act on the incoming flow, but to prevent overrun they are arranged to act on the discharge flow. The theory of operation of these balancing valves is more fully explained in co-pending application of Hans Ernst, Serial Number 614,980 filed June 2, 1932 and therefore further description thereof is not believed to be necessary.

The discharge from motors 14 and 28 is taken care of in the following manner. When the line 57 is under pressure, the return flow from cylinder 28 through port 60 is diverted through channel 69 to port 70 of balancing valve 67 and the return flow from the table cylinder 14 is conducted through channel 71 to port 72 of valve 68. It will be noted that at this time the channel 59 is not under pressure while the feed channel 66 is under pressure, and therefore the valve plunger 73 of valve 68 will shift sufficiently to the right to connect port 72 to port 74 permitting a comparatively free flow through the valve. Port 74 is connected to port 76 of valve 67 by channel 75. In this valve 67 the pressure on both ends will be substantially equal so that the ports 70 and 76 will be alternately connected to port 77. In other words, as the pressure rises in channel 66 above that in 57 the valve plunger 78 will shift slightly to the right and permit a greater flow from port 76 than from port 70 which will thereby relieve the higher pressure in channel 66 and equalize it with that in channel 57. If the pressure in channel 57 rises above that in 66 the reverse operation will take place. It will be noted that the annular groove 77' is slightly wider than the cylindrical portion of the spool which permits a continuous restricted flow on both sides when the valve spool is in a central position. This is also true in the other balancing valves.

Similarly, if the channels 59 and 66 are connected to pressure, the valve plunger 73 will then move to a neutral or central position while the valve plunger 79 will shift to the right due to the drop in pressure in channel 57 and the balancing of the return flow will then take place in valve 68. Port 60 of cylinder 28 will then be under pressure and port 58 will exhaust, the returning fluid passing through the branch line 77 to port 78 of valve 68. As this valve shifts back and forth, ports 72 and 78 will be alternately connected to port 74 and the fluid will have a free escape through valve 67 due to the shifting thereof to the right. It will thus be seen that these two balancing valves serve alternately and automatically to balance the flow between the feed cylinder and either end of the cutter slide cylinder 28.

The other flow dividing valve 41 serves to divide the flow from branch line 50 between opposite ends of the cylinder 32 and the table feed cylinder 14. This valve is similarly provided with a pressure port 80 and distributor ports 81 and 82, the port 81 being connected by channel 83 to the "out" end of cylinder 32, and the port 82 being connected by channel 84 to the "in" end of cylinder 32.

A pair of balancing valves 85 and 86 are also provided for balancing the flow between channel 66 and channels 83 and 84, the valve 85 having table feed channel 66 connected to one end and the infeed channel 84 connected to the opposite end; while the valve 86 has the feed channel 66 connected to one end and the outfeed channel connected to the opposite end. The port 87 of cylinder 32 is connected by branch line 88 to valve 85 and the port 89 is connected by branch line 90 to valve 86. Also the port 77 from valve 67 is connected by channel 91 to port 92 of valve 86 so that when the outfeed channel 83 is under pressure, the return flow from the infeed end of cylinder 32 is balanced against the table cylinder return line 91 because the opposite ends of valve 86 are under pressure. Also there will be a free escape from port 93 through valve 85 due to the fact that port 94 thereof will be connected to port 95 because the pressure in channel 66 will be higher than the pressure in channel 84 shifting the plunger 96 of the valve to the left. When pressure is connected to channel 84, plunger 96 will balance the return flow from channel 83 against the return flow from the table cylinder and the plunger of valve 86 will shift to the left due to the higher pressure in channel 86 over that in 83 thereby permitting a free flow from port 92 to port 93. It will thus be seen that the valve 41 serves to proportion the flow between the table cylinder 14 and the cutter slide cylinder 32 and that the complementary flows to these two cylinders is maintained by the balancing valves 85 and 86.

Attention is invited to the fact that when the valve 41 is in a neutral position and the channel 66 is under pressure due to a flow to either the in or out end of cylinder 28, the plungers of balancing valves 85 and 86 are shifted to the left permitting a free escape through them in series to reservoir so that the valves 67 and 68 will function properly to control the flow therethrough. Similarly, when the flow dividing valve 40 is in a neutral position the pressure in feed line 66 will be higher than either the pressure in line 57 or 59 and therefore the two plungers of balancing valves 67 and 68 will shift to the right permitting a free escape from the table cylinder return line 71 through them so that the balancing valves 85 and 86 will be effective to balance the flow between the table cylinder 14 and the slide cylinder 32.

As previously mentioned, it is desired that the table feed shall not be greater than the slowest rate required by either tracer mechanism and this is accomplished by coupling the feed line in series through the flow dividing valves 40 and 41. For instance, the line 49 may be provided with a branch line 97 which is connected to a port 98 of valve 41 and the corresponding outlet port 99 may be connected by channel 100 to port 61 of valve 40. From this it will be seen that when the plunger of valve 40 is in a neutral position, ports 62 and 61 will be connected by cannelure 63 in such a manner as to permit a maximum flow therethrough, and therefore any shifting of the plunger in valve 41 will tend to decrease the flow through channel 100 to supply port 61 and thereby the feed rate of the table will be reduced. Similarly, if the plunger in valve 41 is in a neutral position permitting maximum flow from port 98 to port 99 then any shifting of plunger in valve 40 will tend to constrict the flow from channel 61 to channel 62 and thereby cut down the feed rate. It is thus apparent that either tracer controlled valve may control the feed rate and that the feed rate will be the smaller of the two rates as determined by these valves.

In addition it will be seen that during the cutting stroke, fluid is supplied to the two tracer control valves from the pump 42, the fluid passing through the rate control valve 48 which determines the rate of operation of the machine. Also each tracer controlled valve determines the position of its respective cutter slide and potentially determines the rate of movement of the table, automatic means being provided whereby the slower of these two potential rates will be impressed upon the table.

Upon completion of a cutting stroke, a suitable dog 101 carried by the table will trip the pilot valve 102 and effect power shifting of the cycle control valve plunger in valve 47. Shifting of this plunger will disconnect the pressure from channel 49 and connect it to channels 103, 104 and 105. The first effect produced by shifting the cycle control valve is to cause retraction of the cutter slides relative to the table so that during the return movement of the table there will be no possibility of interference between the cutter or tracer and any projections on the work or pattern. To this end the channel 105 is connected by a branch line 106 to port 107 of the withdrawal limiting valve 108 having a reciprocable plunger 109. This plunger is normally held in a position by spring 110 whereby the port 107 is connected to port 111 by the cannelure 112 formed in the plunger. A channel 113 couples the port 111 to port 87 of slide valve cylinder 32.

The channel 105 is also connected to port 114 of a second withdrawal limiting valve 115 which has a plunger 116 normally held in position by a spring 117 to couple port 114 to the port 118. This port is connected by channel 119 to the port 60 of the side valve cylinder 28. It will now be seen that fluid is being delivered to each of the cutter slide cylinders in parallel, and it will be noted that it is applied to that end of the cylinders in which the piston has the larger area so that even although pressure may exist in the opposite ends of these cylinders there will be a pressure differential created which will cause outward movement of the slide. As a matter of fact, the opposite ports 89 and 58 of these cylinders are connected by branch lines 120 and 121 to channel 104 which is under pressure at this time. The effect of this is that, due to the pressure differential, the pistons will move and the fluid forced out of ports 89 and 58 will pass through channel 104 to the cycle control valve and thence into the common supply line 122 and join the flow coming from the pump to increase the flow in channel 105 and thereby produce in effect a rapid traverse retraction of the cutter slides.

As the cutter slide 19 reaches the end of its return stroke, it engages the end of valve plunger 109 moving the same to the left as viewed in Figure 3 thereby disconnecting port 107 from port 111 which will gradually reduce and finally stop the slide movement and at the same time connect the port 107 to port 123 to which is connected the channel 124 leading to port 125 of the other limiting valve 115. Similarly, withdrawal of the cutter slide 19 will engage the end of plunger 116 to finally disconnect port 114 from port 118 and thus slow down and stop the cutter slide movement. This shifting of the valve plunger 116 will also connect port 125 to port 126 to which is connected channel 127 leading to the table cylinder 14. Channel 105 is thus finally connected to the end of the table cylinder after each cutter slide has completed its outward movement. The other end of the table cylinder is connected to pressure through the channel 103. Due to piston differential, the piston 15 will move in such a direction as to force the fluid from cylinder 14 through channel 127 to channel 105 where it will combine with the flow of the pump and be delivered through channel 103 to increase the normal flow from the pump and in effect produce a rapid return movement of the table. From the foregoing it will be seen that although pressure is immediately admitted to cylinder 103 upon shifting of the cycle control valve that the opposite end of the table cylinder is closed temporarily to lock the fluid therein and prevent return movement of the table until both of the cutter slides have been retracted to a safe position in which no interference will occur between the cutter and tracer and the pattern and work. It will also be noted that this end of the table cylinder is connected in series through the two withdrawal limiting valves so as to insure that both have returned before the table starts to move and that these valves are so arranged that even although one cutter slide returns before the other it does not interfere with the completion of the other cutter slide movement.

As the table completes its return stroke, a stop pin 128 thereon engages the end of a by-pass valve plunger 129 which when opened by-passes the fluid from channel 127 to a return line 130. This will automatically cause the table to stop and the parts are now in a position to permit the operator to change the work. After changing the work the next cycle will be initiated by shifting the pilot valve manually to effect shifting of the cycle control valve to the left in the position shown in Figure 3.

There has thus been provided an improved profiling machine having greater productive capacity than machines of the past and in which the same or different profiles may be simultaneously produced on single or different work pieces and in which the feed rate of the table is so controlled that if different profiles are used, the rate of movement of the table will be in accordance with the profile requiring the slower rate of movement.

That which is claimed is:

1. A pattern controlled machine for reproducing a plurality of patterns on work carried by a movable support comprising separate cutters for reproducing each pattern, a motor for moving said support, individual tracer controlled mechanisms for determining the direction of relative movement between each cutter and said support, each mechanism including means for determining the rate of operation of said motor, and means to select automatically the lowest of said rates for motor actuation.

2. A machine tool for reproducing a plurality of patterns on work comprising a unitary work support, separate cutters for forming each pattern on the work, a motor for moving said work support, individual tracer controlled mechanisms associated with each pattern for determining the resultant direction of movement between its respective cutter and the work, each of said mechanisms including means for determining the rate of said motor, and means to impress the lowest of said rates on the motor.

3. A pattern controlled milling machine comprising a movable work support, a plurality of patterns to be reproduced on work carried by the support, individual cutters for reproducing each pattern, power actuated means for moving said support, individual tracer controlled mechanisms for determining the direction of relative movement between the respective cutters and the work whereby each mechanism will predetermine a rate of operation of said support, and means to actuate the support at the lowest of said rates.

4. A pattern controlled machine tool having a unitary pattern and work support, a plurality of cutters in operative relation thereto, dual tracer controlled mechanisms associated with separate patterns carried by the support for controlling the movement of the cutters to produce simultaneously different profiles on the work, means controlled by each tracer mechanism for determining the components of resultant movement between its respective cutter and the work, one component of each of said resultant movements being potentially performable by the support, and means to impress the lower of the two components on the support.

5. A multiple pattern controlled machine tool comprising a first pair of slides for supporting a cutter and work for relative movement in two directions, a second pair of slides for supporting an additional cutter and work for relative movement in two directions, there being one slide common to each pair of slides, patterns associated with each pair of slides for reproduction by the cutter on the respective work, individual tracer controlled mechanisms associated with each pair of slides, means for normally imparting a predetermined feed rate to said common slide, and means controlled by said tracer mechanisms upon effecting movement of their respective slides to reduce the feed rate of said common slide.

6. A pattern controlled machine tool having a unitary work support, a plurality of patterns, a plurality of cutters for reproducing the respective patterns on the work, separate tracer controlled mechanisms each including a tracer adapted to cooperate with a given pattern for determining the rate of movement of a given cutter toward and from the work, and means controlled by the several tracer mechanisms for reducing the rate of movement of the work support upon initiating movement of any cutter toward or from the work.

7. A machine tool having a movable work support, pattern controlled mechanisms for reproducing a plurality of patterns on work carried by the support including individual cutters for reproducing each pattern, individual tracer controlled mechanisms associated with each pattern for controlling movement of the respective cutters toward and from the work during traversing movement thereof, and means controlled by said tracer mechanisms for progressively decreasing the rate of movement of the work support upon progressive increase in the rate of movement of any cutter.

8. A pattern controlled machine tool having a movable support, a plurality of patterns to be reproduced on work carried by the support, separate reproducing units associated with each pattern including a cutter controlled by each, power actuated means for traversing the table, separate means controlled by each of said units for imparting different velocities of movement to the respective cutters in accordance with the deflection of the tracer and means connecting the unit having the higher velocity to the table for controlling the rate of movement thereof.

9. A pattern controlled machine tool having a movable work slide, a plurality of cutter slides movable transversely thereof, a plurality of different patterns to be reproduced in the work, a tracer mechanism associated with each pattern for determining relative movement between the respective cutter and work whereby the velocities of the two cutter slides may vary, and means to connect the table automatically to the slide having the higher velocity for control thereby.

10. A pattern controlled machine tool having a work slide, a pair of cutter slides movable toward and from the work slide, a plurality of patterns carried by the slide, a tracer controlled mechanism associated with each pattern and connected to control a particular cutter slide, hydraulic operating means for each slide, a common source of pressure therefor, means coupling the source of pressure to said tracer controlled mechanisms in parallel, means connecting the source of pressure to said work slide through the tracer controlled mechanisms in series, and interdependent connections between said tracer controlled mechanisms whereby the reactance of either in determining relative traverse between work supports and cutters is dependent on the position of the other thereof.

11. A pattern controlled milling machine having a movable work slide, a plurality of patterns carried by the work slide, a pair of cutter slides for movement toward and from the work slide, each cutter slide carrying a tracer controlled mechanism including a control valve for determining its rate of movement and means coupling the valves in series for controlling the ultimate rate of movement imparted to the table.

12. A pattern controlled milling machine having a work slide, a plurality of patterns carried thereby, means for reproducing each pattern on work carried by the slide including separate tracer controlled mechanisms, slides for the respective mechanisms, each slide having a cutter mounted thereon, hydraulic motors for effecting reciprocation of the work slide and said tracer controlled slides, a source of pressure therefor, a reversing valve associated with each mechanism and controlled by the tracer for determining in and out movement of the cutter slide relative to the work, channels connecting said valves in parallel to the source of pressure, additional portions on the valves for determining the flow of pressure to the table motor, and interdependent connections between said valves whereby the rate of relative traverse between work support and cutters determined by either is dependent on the position of the other thereof.

13. A pattern controlled milling machine for reproducing a plurality of patterns simultaneously on a plurality of work pieces including a common work slide, individual tracer controlled mechanisms associated with each pattern including a slide and a cutter carried thereby for movement toward and from the work, hydraulic motors associated with each slide for actuation thereof, separate hydraulic circuits associated with each mechanism for controlling the movement of its respective cutter slide and the movement of the work support, a tracer controlled valve associated with each mechanism, channels extending therefrom to the respective slide motor for alternately receiving a propelling flow to advance or retract the cutter, an additional channel extending from the valve to the table motor for delivering a feeding fluid thereto, and balancing valves between the feed motor and each end of the cutter slide motors for maintaining the proportionate division of flow therebetween.

14. A multiple pattern controlled machine tool having a work and pattern support, a feed motor therefor, a plurality of cutter slides for movement toward and from the support, individual motors for said slides, hydraulic control means for determining the movement of each of said cutter slides and the rate of feed of said work support including separate tracer controlled valves carried by each slide, fluid connections between each valve and its slide motor, additional fluid connections between the valves and said feed motor, a source of pressure, a rate control valve for determining the volumetric delivery of fluid to said tracer control valve and thereby the rate of operation of said machine.

15. A multiple pattern controlled machine tool having a common work and pattern support, a plurality of cutter slides for movement toward and from the support, hydraulic control means for determining the movement of each of said slides and the rate of feed of said work support including individual actuating motors, separate tracer controlled valves carried by each cutter slide, fluid connections between each valve and its slide motor, additional fluid connections between each valve and the work support motor, a source of pressure, a rate control valve for determining the volumetric delivery of fluid to said tracer controlled valves and thereby the rate of operation of said machine, and an additional control valve interposed between the source of pressure and said rate control valve for disconnecting the same from the tracer control valve and directly connecting it to said table motor for returning the same to starting position at a rapid traverse rate.

16. A pattern controlled machine tool having an hydraulically actuated work slide, means to support a plurality of different patterns thereon, cutter slides associated with each pattern and movable toward and from the work slide, tracer controlled mechanisms for effecting in and out movement of the cutter slides during traversing movement of the work slide to effect reproduction of the respective patterns on the work, trip actuated means for effecting withdrawal of the cutter slides at the end of the working stroke, and individual stop valves for terminating movement of each cutter slide as it reaches the end of its stroke.

17. A pattern controlled machine tool having an hydraulically actuated work slide, means to support a plurality of different patterns thereon, cutter slides associated with each pattern and movable toward and from the work slide, a tracer controlled mechanism for effecting in and out movement of the cutter slides during traversing movement of the work slide to effect reproduction of the respective patterns on the work, trip actuated means for effecting withdrawal of the cutter slides at the end of the working stroke, individual stop valves for terminating the movement of each cutter slide, and means associated with each cutter slide and connected in series for coupling pressure to the table motor after all of the cutter slides have returned to starting position.

18. A pattern controlled machine tool having an hydraulically actuated work slide, means to support a plurality of different patterns thereon, cutter slides associated with each pattern and movable toward and from the work slide, a tracer controlled mechanism for effecting in and out movement of the cutter slides during traversing movement of the work slide to effect reproduction of the respective patterns on the work, trip actuated means for effecting withdrawal of the cutter slides at the end of the working stroke, individual stop valves for terminating the movement of each cutter slide as it reaches the end of its stroke, means associated with each cutter slide and connected in series for coupling pressure to the table motor after all of the cutter slides have returned to starting position, and valve means automatically actuable by the table for by-passing the returning flow thereto and thereby stop the table.

19. A milling machine having a bed, columns extending upwardly from opposite sides of the bed, a cross rail supported by the column, a work support slidably mounted on the bed, a pair of cutter slides mounted on the cross rail for movement toward and from the table, a plurality of different patterns carried by the table, tracer control mechanism carried by each cutter slide and adapted to cooperate with a particular pattern on the table for determining in and out movement of the cutter during traverse of the work table, hydraulic motors for actuating said slides, hydraulic control mechanism associated with each tracer for individually determining the rate of movement of the respective cutter slides, said mechanisms being serially connected for determining the rate of movement of the work slide.

20. A milling machine having a bed, columns extending upwardly from opposite sides of the bed, a cross rail supported by the column, a work support slidably mounted on the bed, a pair of cutter slides mounted on the cross rail for movement toward and from the table, a plurality of different patterns carried by the table, tracer control mechanism carried by each cutter slide and adapted to cooperate with a particular pattern on the table for determining in and out movement of the cutter during traverse of the work table, hydraulic motors for actuating said slide, hydraulic control mechanism associated with each tracer for individually determining the rate of movement of the respective cutter slides and the rate of movement of the work slide, and trip controlled means associated with the table for effecting return movement thereof, and means to delay said return movement until the cutter slides have returned to starting position.

21. A pattern controlled machine tool for reproducing a plurality of patterns on work carried by a movable support comprising separate rotatable cutters for reproducing each pattern, power operable means for moving said support, individual tracer controlled mechanisms for determining the direction of relative movement between each cutter and said work support whereby either cutter may be stationary during movement of the other cutter, and means whereby the moving cutter will assume control of the rate of movement of the work support during non-movement of the other cutter.

22. A pattern controlled milling machine for reproducing a plurality of patterns on work carried by a movable support comprising separate rotatable milling cutters for reproducing each pattern, power operable means for moving said work support, individual tracer controlled mechanisms for determining the direction of relative movement between each cutter and said work support whereby either cutter may be stationary during movement of the other or both cutters may be bodily moved simultaneously in the same or opposite directions, means operable by the moving cutter for assuming and determining the work support feed rate during non-movement of the other cutter, said last named means being serially connected and inter-dependent connections between said tracer controlled mechanisms whereby the reactance of either in determining relative traverse between work support and cutters is dependent upon the position of the other thereof.

23. A milling machine having a bed, columns extending upwardly from opposite sides of the bed, a cross rail supported by the columns, a work support slidably mounted on the bed, a pair of cutter slides mounted on the cross rail for movement toward and from the table, a cutter spindle journaled in each slide, a prime mover carried by the rail, motion transmitting means extending therefrom for rotation of the cutter spindles in all positions of adjustment of the slides, a plurality of different patterns carried by the table, tracer control mechanism carried by each cutter slide cooperating with a particular pattern for determining in and out movement of the cutter during traverse of the work table, power operable means for actuating said slides, control mechanism associated with each tracer for individually determining the rate of movement of the respective cutter slides and jointly determining the rate of movement of the work slide.

24. A pattern controlled machine for reproducing a plurality of patterns on work comprising separate cutters for reproducing each pattern, a motor for effecting relative movement between the cutters and work in one direction, individual tracer controlled mechanisms for determining the direction of resultant relative movement between each cutter and the work, each mechanism including means for determining the rate of operation of said motor, and means to select automatically the lower of said rates for motor actuation.

25. A machine tool for reproducing a plurality of patterns on work comprising a common support for the work and patterns, separate cutters for forming each pattern, a motor for effecting relative movement between the work support and cutters in one direction, individual tracer controlled mechanisms associated with each pattern for determining the resultant direction of relative movement between its respective cutter and the work and thereby the rate of the component movement to be performed by said motor, and means to impress the lower of said rates on the motor.

26. A pattern controlled milling machine comprising means for supporting work upon which a plurality of patterns is to be reproduced, individual cutters for reproducing each pattern, power actuated means for effecting a relative feeding movement between the cutters and work, individual tracer controlled mechanisms for determining the resultant direction of relative movement between the respective cutters and the work whereby each mechanism will predetermine a component feed rate, and means to effect the lower of said feed rates.

27. A pattern controlled milling machine comprising a work support, a plurality of patterns to be reproduced on work carried by the support, individual cutters for reproducing each pattern, individual tracer controlled mechanisms for determining the ultimate rate and direction of relative movement between the respective cutters and the work, each ultimate rate having a component in a common direction, and means to effect relative movement between the cutters and the work support in said common direction and at the lower of said component rates.

BERNARD SASSEN.